United States Patent [19]

Narumi et al.

[11] Patent Number: 5,318,086
[45] Date of Patent: Jun. 7, 1994

[54] PNEUMATIC OFF-THE-ROAD TIRES

[75] Inventors: Katsuya Narumi, Kodaira; Toshiaki Kobayashi, Tokyo, both of Japan

[73] Assignee: Bridgestone Corporation, Tokyo, Japan

[21] Appl. No.: 600,298

[22] Filed: Oct. 22, 1990

Related U.S. Application Data

[63] Continuation of Ser. No. 284,561, Dec. 15, 1988, abandoned.

[30] Foreign Application Priority Data

Dec. 17, 1987 [JP] Japan .................. 62-320500

[51] Int. Cl.⁵ .................................. B60C 11/11
[52] U.S. Cl. .................. 152/209 B; 152/209 R
[58] Field of Search .......... 152/209 B, 209 R, 209 D, 152/209 A

[56] References Cited

U.S. PATENT DOCUMENTS

D. 255,674  7/1980  Menin .................. 152/209 B

FOREIGN PATENT DOCUMENTS 4611  1/1987  Japan .................. 152/209 D
1284847  1/1987  U.S.S.R. .................. 152/209 B

*Primary Examiner*—Geoffrey L. Knable
*Attorney, Agent, or Firm*—Sughrue, Mion, Zinn, Macpeak & Seas

[57] ABSTRACT

A pneumatic off-the-road tire is used in motorcycles for motocross racing, and comprises a tread having a particular block arrangement of offset blocks and side blocks.

8 Claims, 4 Drawing Sheets

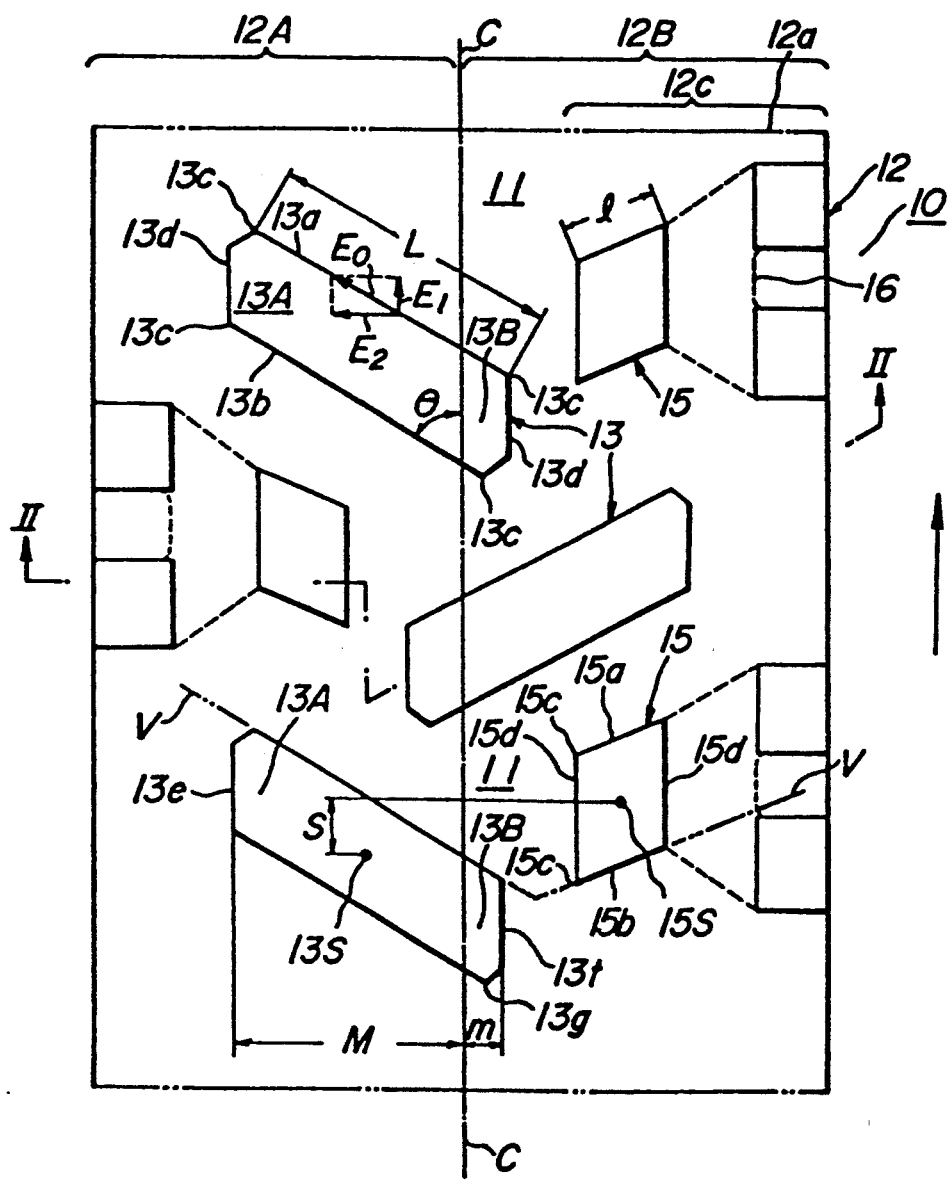
FIG_1

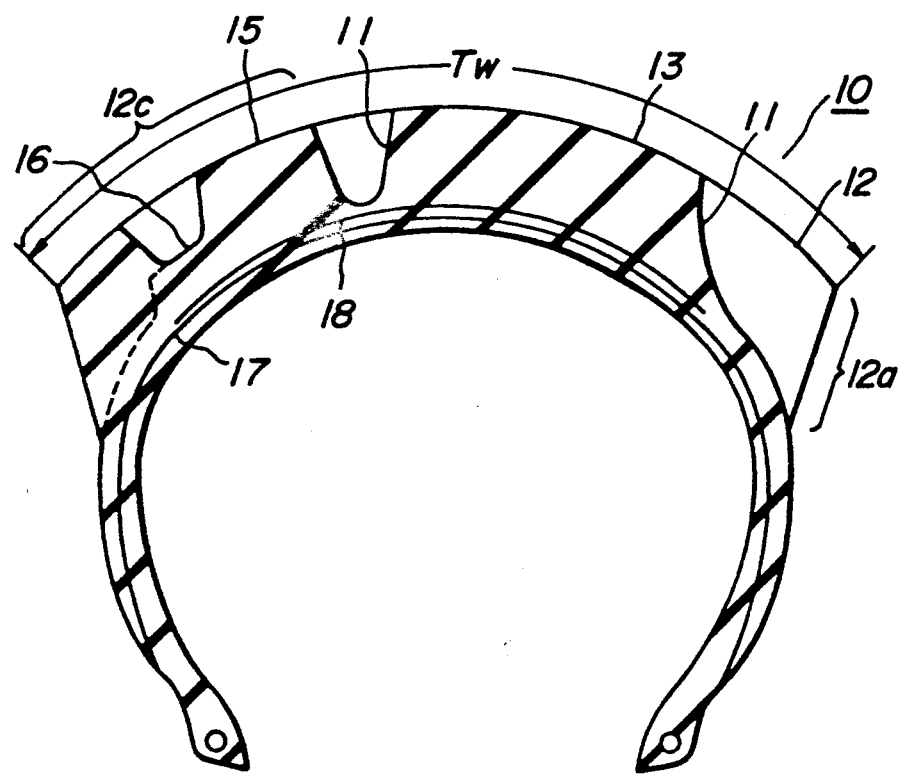
FIG_2

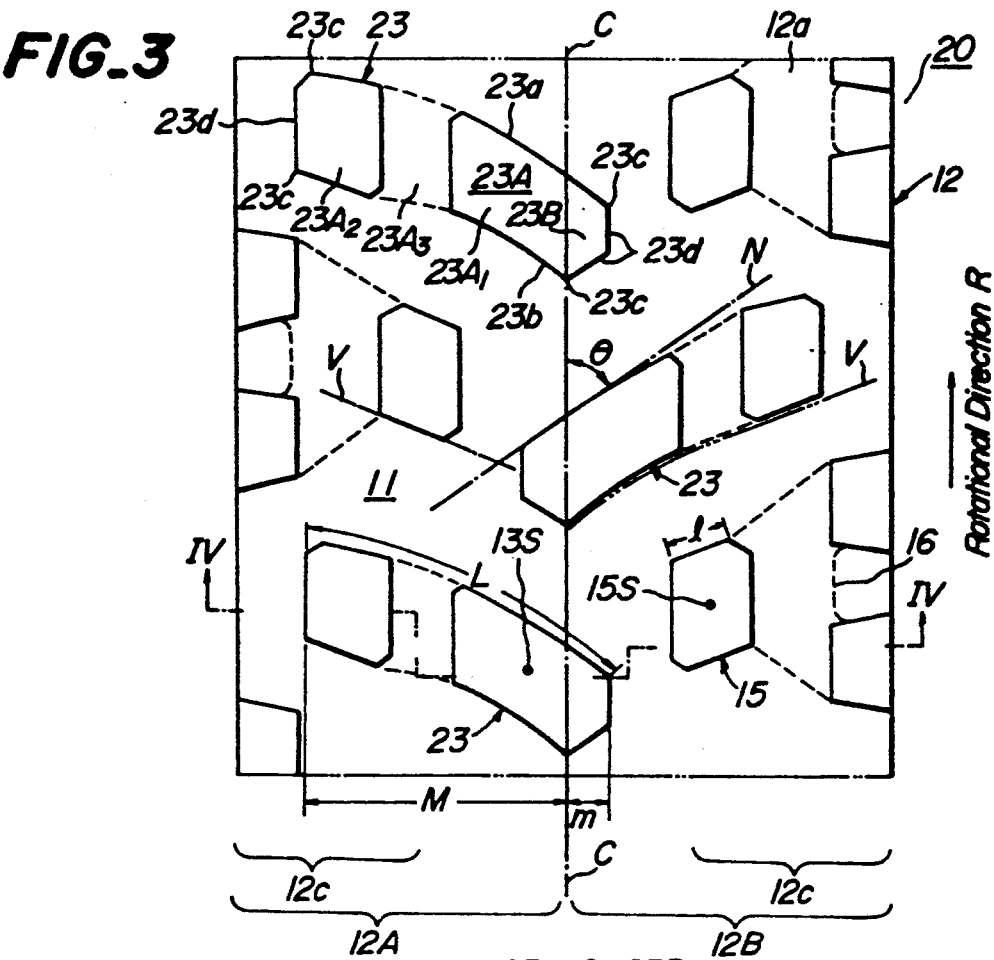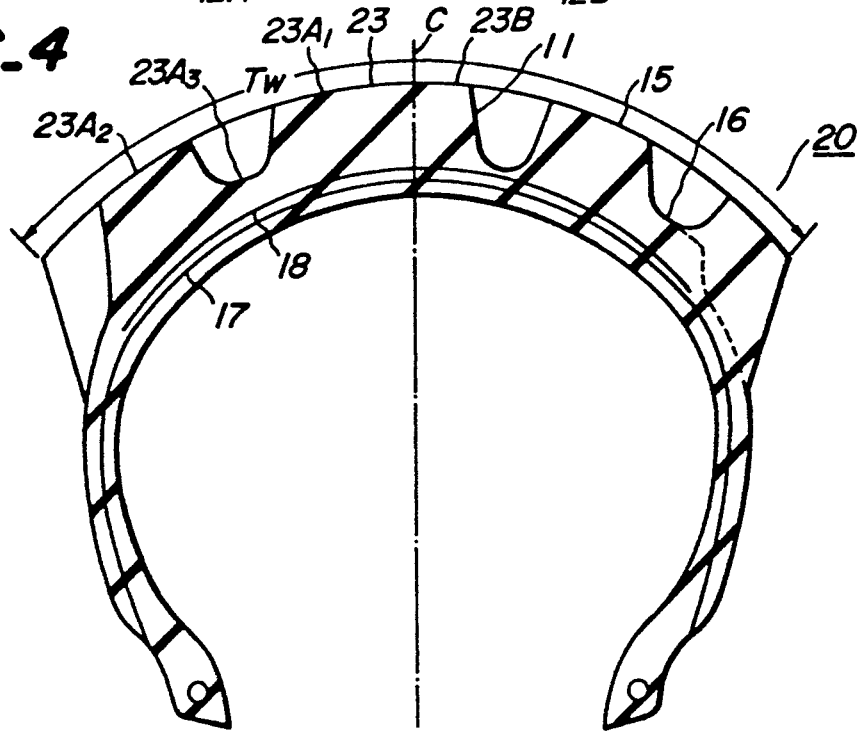

PNEUMATIC OFF-THE-ROAD TIRES

This is a continuation of application Ser. No. 07/284,561 filed Dec. 15, 1988 now abandoned.

BACKGROUND OF THE INVENTION

1. Field of the Invention

This invention relates to pneumatic off-the-road tires, and more particularly to an improvement in the running performance of the pneumatic off-the-road tires used in motocross racing of running motorcycles on rough roads consisting of soft and hard road surfaces.

2. Related Art Statement

Heretofore, a tire as shown in FIG. 6 has been known as the pneumatic off-the-road tire. In FIG. 6, numeral 1 is a pneumatic off-the-road tire used in motocross racing, which has a tread pattern dividing a surface portion 2a of a tread 2 by grooves 3 into many isolated blocks 5. The size and arrangement of the block 5 are determined considering straight running road and cornering road in the racing course, the state of road surface and the like. In the conventional pneumatic off-the-road tires, blocks 5A arranged in a central portion 2b of the tread 2 attach importance to traction performance, so that blocks 5 with an edge 5a extending in the widthwise direction of the tire are fundamentally arranged in the central portion 2b. Thus, traction performance against momentary torque is obtained during straight running.

However, when the pneumatic off-the-road tire 1 is run on a circuit course for motocross racing, the motorcycle runs not only on the straight running road but also on the cornering road while being largely inclined at a large camber angle in both left and right directions. In this case, the tread 2 of the tire 1 shifts its ground contact area from the central portion 2b to both side portions 2c to thereby generate a large lateral force in the lateral direction. In the tread pattern as shown in FIG. 6, there is a problem in that the shifting of the ground contact area from the central portion 2b to the side portion 2c does not exhibit gentle behavior. That is, in the conventional tire 1, it is difficult to simultaneously establish traction performance and shifting performance, so that the driver is required to have a special driving technique in running on the cornering road.

SUMMARY OF THE INVENTION

It is, therefore, an object of the invention to provide a pneumatic off-the-road tire having not only the sufficient traction performances during the running on straight running road but also the shifting performance gently behaving in the lateral direction during the running on the cornering road in left and right directions.

BRIEF DESCRIPTION OF THE DRAWINGS

FIGS. 1 and 2 are partial plan view and schematically sectional view of a first embodiment of the pneumatic off-the-road tire according to the invention, respectively;

FIGS. 3 and 4 are partial plan view and schematically sectional view of a second embodiment of the pneumatic off-the-road tire according to the invention, respectively;

DESCRIPTION OF THE INVENTION

The inventors have made various studies with respect to the size, shape and arrangement (position and inclination angle) of blocks in the tread, torque generated in the block, lateral force and its shifting property and the like.

Figure 5:
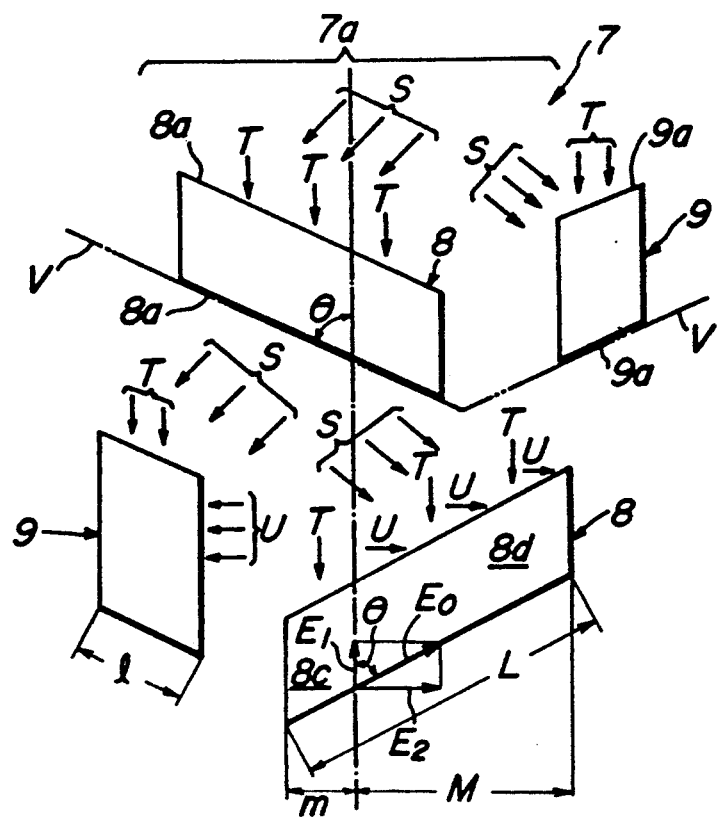
FIG. 5 is a diagrammatical view showing a fundamental concept of the invention.

As a result, referring Fig. 5 it has been found that when a block 8 arranged in a central portion 7a of a tread 7 is substantially rectangle, a long edge 8a of the block 8 is arranged so as to start from one side of the tread 7 and extend over a tread center C to the other side of the tread 7. A side block 9 having an edge 9a shorter than that of the long edge 8a of the block 8 is arranged outside the block 8. The long edge 8a of the block 8 and the short edge 9a of the side block 9 form a V-shape (shown by phantom line in FIG. 5), whereby the traction performance and straight running stability on the straight running road and the road gripping performances on the cornering road are improved. That is, the traction performances are effectively developed by bearing a torque T acting to the tread 7 with the long edge 8a and short edge 9a of the blocks 8 and 9 during running. Also the mud biting and mud repelling are more effectively developed by the V-shaped arrangement of the long edge 8a and the short edge 9a. Further, the straight running stability is effectively developed by a balanced controlling of shakes U generated from the tread center C toward left and right directions through the edges inclined with respect to the circumferential direction. Moreover, lateral force S against centrifugal force in cornering is effectively received by a part of the long edge 8a of the block 8 and the short edge 9a and long edge 9b of the side block 9. It is easily shifted by the long edge 8a of the block 8 extending from the one side of the block 8 over the tread center C to the other side thereof, whereby the road gripping property in cornering is effectively developed.

The inventors have made further studies with respect to the above and as a result, the invention has been accomplished.

That is, the invention provides a pneumatic off-the-road tire comprising a tread divided by grooves into offset blocks each having two long edges inclined at an angle of 40°-75° with respect to the circumferential direction and arranged substantially in parallel to each other and two edges connecting both ends of these long edges, said blocks being arranged in offset form with respect to the tread center and in zigzag form with respect to the circumferential direction so that said long edges of said blocks are alternately arranged in said inclination angle opposite to each other, and side blocks each arranged in a shoulder portion of the tread at a side of said offset block having a small offset amount and having two short edges inclined at a given angle with respect to the circumferential direction and arranged substantially in parallel to each other and two edges connecting both ends of these short edges; said long edge of the offset block and said short edge of the side block being arranged in a substantially V-shaped form.

The term "edge" used herein means a linear edge segment defining the periphery of each of the offset blocks and side blocks formed in the surface portion of the tread.

The term "offset arrangement" used herein means such an arrangement that when the tread is divided into left and right half regions with respect to the tread center, a main portion of the offset block having two long edges arranged substantially in parallel to each other and two edges connecting both ends of these long edges is existent in the half region of the tread and is provided with a protruding portion extending over the tread center toward the other half region of the tread and the block area of the main portion is larger than that of the protruding portion.

The reason why the inclination angle $\theta$ of the long edge in the offset block with respect to the circumferential direction is limited to a range of 40° to 75° is due to the fact that when the inclination angle is less than 40°, as shown in FIG. 5, the circumferential length $E_1$ with respect to the unit length $E_0$ of the long edge 8a increases and the widthwise length $E_2$ decreases and consequently the sufficient traction performance is not obtained. While, when it exceeds 75°, the circumferential length $E_1$ decreases and the widthwise length $E_2$ increases to obtain sufficient traction performance, but the straight running stability degrades and also the shifting performance from straight running to cornering is poor.

As shown in FIG. 5, the offset amount is a distance from the tread center C to the end of the block 8 in widthwise direction, wherein m is an offset amount of the protruding portion 8c in the block 8 and M is an offset amount of the main portion 8d in the block 8. According to the invention, it is preferable that the offset amount m of the protruding portion 8c is 0.25–0.75 times of the offset amount M of the main portion 8d. When the offset amount m is less than 0.25 times of the offset amount M, the overlapping amount of the offset blocks arranged zigzag in the circumferential direction is too small and the straight running stability and the shifting performance during the running are degraded. When it exceeds 0.75 times, the adjoining offset blocks completely overlap with each other in the circumferential direction to form substantially a lug to thereby degrade the straight running stability, and the balance between zigzag arranged blocks is lost to reduce the shifting performance.

The widthwise length m+M of the offset block is within a range of 15% to 35% of peripheral length TW in widthwise direction of the tread. The circumferential length between the long edges of the offset block is within a range of 40% to 70% of the widthwise length m+M.

Further, the length l of the short edge 9a of the side block 9 is preferable to be within a range of 25% to 75% of the length L of the long edge 8a of the offset block 8. When the length l is less than 25% of the length L, the widthwise length of the side block 9 is too small and the traction performances are lacking. When it exceeds 75%, the widthwise length of the side block 9 is too long and the straight running stability and the shifting performance based on the zigzag arrangement are injured.

Moreover, a ratio of groove area in the tread to full area of the tread, i.e. negative ratio is favorable to be 65–85%.

When the pneumatic off-the-road tire according to the invention is run on a straight running road at a high speed and turned on a cornering road at a large camber angle, since the offset blocks are arranged in offset form to incline the long edge of the block at an angle of 40° to 75° with respect to the circumferential direction and the side blocks are separated away from and arranged outside the offset blocks in such a manner that the short edge of the side block and the long edge of the offset block form approximately V-shape, the sufficient traction performances are developed while effectively conducting mud biting and mud repelling through the V-shaped arranged long edge and short edge. Also the straight running stability is improved while a balanced controlling the left and right shakes in the straight running through the offset arrangement and the V-shaped arranged long edge and short edge. Furthermore, the lateral force generated in cornering is controlled by these long edges and short edges and edges connecting both ends of these long and short edges to improve the road gripping performance. Moreover, the offset blocks are arranged in offset form to form an overlapping portion in the circumferential direction, whereby the gentle behavior of shifting from the straight running to the cornering is obtained to improve the shifting performance.

FIGS. 1 and 2 illustrate a first embodiment of the pneumatic off-the-road tire according to the invention, wherein numeral 10 is a pneumatic off-the-road tire having a tire size of 110/100-18 and used for motocross racing.

The tire 10 comprises a tread 12, offset blocks 13 radially protruding in a surface portion 12a of the tread 12 from surrounding groove 11 and arranged in offset form with respect to a tread center C and in zigzag form in the circumferential direction. Side blocks 15 are arranged in a shoulder portion 12c of the tread 12 at a side of the offset block 13 having a small offset amount and radially protruding from the surrounding groove 11. The offset block 13 has two long edges 13a and 13b arranged substantially in parallel to each other at an inclination angle $\theta$ of about 60° with respect to the circumferential direction of the tire, and two bent edges 13d connecting both ends 13c of the long edges 13a and 13b. These offset blocks 13 are arranged zigzag in the circumferential direction so as to alternately incline the long edges 13a and 13b in opposite direction.

The tread 12 is divided into left and right tread half regions 12A and 12B with respect to the tread center C viewed from the outside of the tire. The offset blocks 13 are arranged in such an offset form that a main portion 13A of the offset block 13 is existent in one tread half region 12A and a protruding portion 13B extends from the main portion 13A over the tread center C toward the other tread half region 12B. Thus, the block area of the main portion 13A is larger than that of the protruding portion 13B.

The main portion 13A has an offset amount M as a distance from the tread center C to an outermost end 13e in the widthwise direction. The protruding portion 13B has an offset amount m as a distance from the tread center C to an innermost end 13f, in which the offset amount m is 0.25–0.75 times of the offset amount M. Therefore, the adjoining offset blocks overlap with each other at a width corresponding to two times the offset amount m, so that the straight running stability in the straight running and the shifting performance in the cornering are improved and consequently the driver does not require special care on the control of steering in the cornering.

The side blocks 15 are arranged in a shoulder portion 12c at a side having a small offset amount of the offset block 13 containing the main portion 13A in the tread half region 12A. That is, they are arranged at the other tread half region 12B and separated away from the offset block 13 so as to radially protrude from the surrounding groove 11. Each side block has two short edges 15a and 15b arranged substantially in parallel to each other at a certain inclination angle with respect to the circumferential direction and two edges 15d connecting both ends 15c of the short edges 15a and 15b. The length 1 of the short edge 15a is 25%-75% of the length L of the long edge 13a.

Further, the long edge 13a of the offset block 13 and the short edge 15b of the side block 15 are arranged to form substantially V-shape (shown by phantom line). Also, it is preferable that the centroid 15S of the side block 15 is located at a front side from the centroid 13S of the offset block 13 in the rotational direction R. In the illustrated embodiment, the centroid 15S is located at a front side from the centroid 13S by a distance S, so that the centroid 15S comes into contact with ground as compared with the centroid 13S during the rotation of the tire 10. In the offset block 13, the main portion 13A first comes into contact with ground, and the end 13g of the protruding portion 13B last comes into contact with ground.

In the tire 10, sufficient traction performances against torque is developed while effectively conducting the mud biting and mud repelling by the V-shaped arrangement of the long edge 13a and the short edge 15a during the running, while the left and right shaking generated in the running is balanced controlled by the long edges 13a, 13b, the short edges 15a, 15b and other edges 13d, 15d to maintain straight running stability. Further, the lateral force S in the cornering is effectively received by the edges of the offset and side blocks to develop the road gripping performances.

Numeral 16 in FIG. 2 is a groove of a platform shallower than the bottom 11a of the groove 11. A carcass has a bias structure of two nylon cord plies extending between a pair of beads. Numeral 18 is a breaker of a single nylon layer. The construction other than the above is the same as in the conventional pneumatic off-the-road tire.

FIGS. 3 and 4 illustrate a second embodiment of the pneumatic off-the-road tire 20 according to the invention, wherein the same part as in the first embodiment is represented by the same numeral.

In the second embodiment, the offset block 23 has two long edges 23a and 23b consisting of two curves and two bent edges 23d connecting both ends 23c of these long edges. The main portion 23A is constructed by connecting a first main portion 23A$_1$ at a side of the tread center C and a second main portion 23A$_2$ at a side of the shoulder portion 12c through a platform 23A$_3$. The long edge 23a is inclined at the tread center C at an angle $\theta$ between tangent N of the long edge 23a and tread center C of 40°-75°.

The effect of the invention will be described with respect to the following test using two test tires (Example and Comparative Example).

Figure 6:
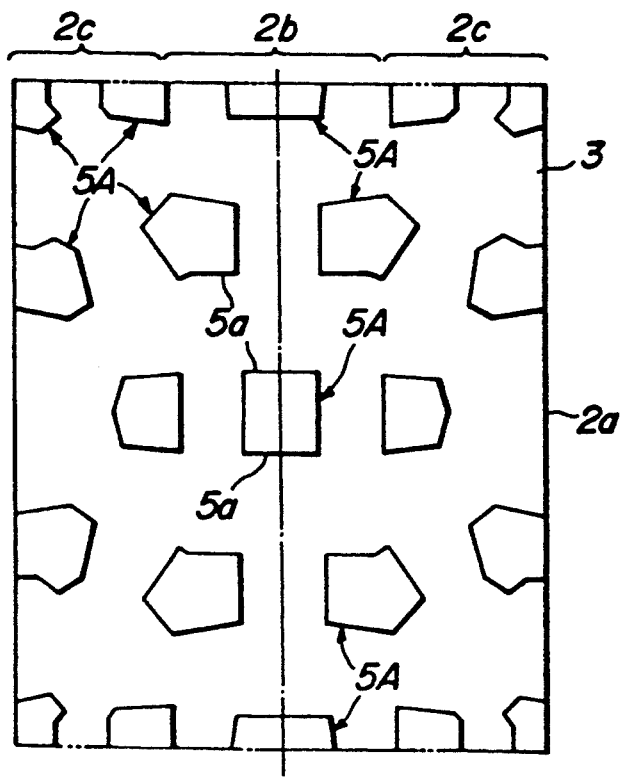
FIG. 6 is a partial plan view of the conventional tire.

The test tire of Example was the same as in the second embodiment of FIG. 3, while the test tire of Comparative Example was the same as in the conventional tire of FIG. 6. These test tires had the same construction other than the tread pattern.

After each of these test tires was mounted on a rear wheel of a motorcycle having an engine displacement of 250 cc and used for motocross racing, the traction performances, straight running stability and cornering performances inclusive of road gripping performance and shifting performance were evaluated by a feeling test of a driver.

The measured results are shown in the following table by an index on the basis that the conventional tire is 100. The larger the index value, the better the property.

|  | Example | Comparative Example |
| --- | --- | --- |
| Corresponding figure | FIG. 3 | FIG. 6 |
| Traction performance | 110 | 100 |
| Straight running stability | 130 | 100 |
| Cornering performances | 120 | 100 |

As seen from the above table, the traction performance, straight running stability and cornering performances are largely improved in the tire according to the invention as compared with the conventional tire.

As mentioned above, in the pneumatic off-the-road tires according to the invention, the straight running stability can largely be improved with sufficient traction performances during the straight running, while the gentle shifting performance can be developed in the cornering to largely improve the cornering performances.

What is claimed is:

1. A pneumatic motocross tire having a directional tread pattern for a rotational direction of said tire when mounted on a motocross vehicle comprising; a tread divided by grooves into offset blocks and side blocks; each of said offset blocks having a substantially parallelogram shape with longitudinal edges being inclined at an angle of 40°-75° with respect to an equatorial plane of the tire and arranged substantially in parallel to each other, said offset blocks extended to be asymmetrically offset from a centerline of said tread and inclined thereto, said offset blocks arranged in zigzag by separating successive offset blocks at a given distance in the circumferential direction of the tire and inclining said successive offset blocks relative to said centerline in opposite directions; said side blocks being arranged in both shoulder portions of said tread and positioned with respect to a side of said offset block having a small offset of said asymmetry and, said side blocks having two edges inclined at a given angle with respect to the circumferential direction of the tire and arranged substantially in parallel to each other, a length of each of said inclined edges of said side blocks being shorter than that of said longitudinal edges in said offset block; and a forward one of said longitudinal edges in each of said offset blocks with respect to the rotational direction of the tire and a rearward one of said inclined edges in each of said side blocks with respect to the rotational direction of the tire together defining by extensions thereof a substantially V-shaped form opening in the rotational direction of the tire during running of the tire.

2. The pneumatic motocross tire according to claim 1, wherein each of said offset blocks consists of a main portion and a protruding portion, said protruding portion having an offset amount corresponding to 0.25-0.75 times of an offset amount of said main portion with respect to a centerline of said tread.

3. The pneumatic motocross tire according to claim 1, wherein each offset block has a widthwise length corresponding to 15-35% of peripheral length of said tread in widthwise direction and a circumferential length between said longitudinal edges corresponding to 40-70% of said widthwise length.

4. The pneumatic motocross tire according to claim 1, wherein said inclined edge of each of the side blocks has a length corresponding to 25-75% of the length of said longitudinal edges of the offset blocks.

5. The pneumatic motocross tire according to claim 1, wherein said tire has a ratio of groove area in said tread to full area of said tread of 65-85%.

6. The pneumatic motocross tire according to claim 1 wherein said offset blocks have a pair of opposed edges which are bent.

7. The pneumatic motocross tire according to claim 1 wherein said at least one of said inclined edges of a side block is aligned with a line extending from one of said longitudinal edges of an offset block.

8. A pneumatic motocross tire having a directional tread pattern for a rotational direction of said tire when mounted for rotation on a motocross vehicle comprising; a tread divided by grooves into offset blocks and side blocks; each of said offset blocks having an elongated longitudinal shape with longitudinal edges being curved and inclined at an angle of 40°-75° formed by a tangent line to a curved edge and an equatorial plane of the tire and arranged substantially in parallel to each other, said offset blocks extended to be asymmetrically offset from a centerline of said tread and inclined thereto, said offset blocks arranged in zigzag by separating said successive offset blocks at a given distance in the circumferential direction of the tire and inclining said successive offset blocks relative to said centerline in opposite directions; said side blocks being arranged in both shoulder portions of said tread and positioned with respect to a side of said offset block having a small offset of said asymmetry and said side blocks having two edges inclined at a given angle with respect to the circumferential direction of the tire and arranged substantially in parallel to each other, a length of each of said inclined edges of said side blocks being shorter than that of said longitudinal edges in said offset block; and a forward one of said longitudinal edges in each of said offset blocks with respect to the rotational direction of said tire and a rearward one of said inclined edges in each of said side blocks with respect to the rotational direction of the tire together defining by extension thereof a substantially V-shaped form opening in the rotational direction of the tire during running of the tire.

* * * * *